(12) United States Patent
Kuwabara et al.

(10) Patent No.: US 6,508,564 B1
(45) Date of Patent: Jan. 21, 2003

(54) SURFACE LIGHT SOURCE DEVICE AND ADJUSTING METHOD OF CHROMATICITY THEREOF

(75) Inventors: Satoshi Kuwabara, Ogaki (JP); Hiroshi Yamashita, Ichinomiya (JP); Toru Yamamura, Ichinomiya (JP); Nobuhito Nishida, Ogaki (JP); Masashi Ochiiwa, Ogaki (JP); Michiaki Satou, Ichinomiya (JP)

(73) Assignee: Sanyo Electric Co., Ltd., Osaka-fu (JP)

( * ) Notice: Subject to any disclaimer, the term of this patent is extended or adjusted under 35 U.S.C. 154(b) by 0 days.

(21) Appl. No.: 09/717,144

(22) Filed: Nov. 22, 2000

(30) Foreign Application Priority Data

Nov. 26, 1999 (JP) .............................. 11-335376
Dec. 24, 1999 (JP) .............................. 11-366294

(51) Int. Cl.[7] .............................. F21V 14/02
(52) U.S. Cl. .................. 362/31; 362/812; 362/559
(58) Field of Search ............... 362/31, 800, 545, 362/231, 230, 330, 551; 257/594; 313/512; 345/82, 83, 102, 46

(56) References Cited

U.S. PATENT DOCUMENTS 5,998,925 A * 12/1999 Shimizu .................. 313/503
6,036,328 A * 3/2000 Ohtsuki .................. 362/31
6,313,816 B1 * 11/2001 Kojima et al. .............. 345/690

FOREIGN PATENT DOCUMENTS

| JP | 8-146228 | 6/1988 |
|----|----------|--------|
| JP | 7-140567 | 6/1995 |
| JP | 9-292614 | 11/1997 |
| JP | 11-052327 | 2/1999 |
| JP | 11-223805 | 8/1999 |
| JP | 02000285718 | * 10/2000 |
| JP | 02000331517 | * 11/2000 |
| KR | 0064124 | 9/2002 |

* cited by examiner

*Primary Examiner*—Sandra O'Shea
*Assistant Examiner*—Hargobind S. Sawhney
(74) *Attorney, Agent, or Firm*—Arent Fox Kintner Plotkin & Kahn

(57) ABSTRACT

In this surface light source device, light is incident from a plurality of point light sources 2 arranged on a one side end surface of a light guide plate 1, is reflected on a light reflecting surface 11 on a rear surface of the light guide plate 1, and is emitted from a front surface of the light guide plate 1. The point light sources 2 comprise white light emitting diode elements. Two white light emitting diode elements out of six of the white light emitting diode elements having chromaticity outermost from a center of an aimed chromaticity range in opposite hue directions are arranged in an approximately center of a group of the white diode elements.

12 Claims, 4 Drawing Sheets

SURFACE LIGHT SOURCE DEVICE AND ADJUSTING METHOD OF CHROMATICITY THEREOF

BACKGROUND OF THE INVENTION

1. Field of the Invention

This invention relates to a surface light source device comprising an aggregate of point light sources comprising light emitting elements such as an LED mainly used for a back light of a liquid crystal display panel, and an adjusting method of chromaticity thereof.

2. Description of Prior Art

An edge light type surface light source using a translucent flat plate as a light guide plate is well known as a surface light source for a backlight of a liquid crystal display panel. In such the surface light source, light is incident from one side end surface (an edge part) of a light guide plate of a translucent parallel flat plate or a wedge-shaped flat plate, and the incident light is diffused uniformly to an entire area of the light guide plate. A part of the diffused light is turned into diffused reflected light by a light reflecting member on a rear surface of the light guide plate, and the diffused light is emitted from a front surface of the light guide plate.

The light guide plate of the edge light type surface light source used as a light source of a liquid crystal display panel is widely used because it enables to reduce a thickness of the light guide plate and to simplify a structure of the light source.

The edge light type surface light source in general is provided with a cold cathode ray tube lamp on the edge part of the light guide plate as a light source.

Meantime, portable type equipment has become popular, and equipment consuming less power comes to be required. In conjunction with this, a light source using an LED element consuming less power as compared with a conventional cold cathode ray tube lamp has been paid attention and has been commercialized as a light source for a backlight of the portable type equipment.

FIG. 1 is a schematic cross sectional view illustrating a surface light source using an LED element. As shown in the figure, the surface light source comprises a light guide plate 1, a point light source 2 formed by an LED element.

A light source part 20 comprising a plurality of the point light sources 2 formed by white LED elements is arranged on an edge part of the light guide plate 1.

A light reflecting surface 11 is arranged on a side vertical to the point light source 2 of the light guide plate 1, and a light emitting surface 12 is arranged on an opposite side to the light reflecting surface 11. A white reflecting sheet 5 is arranged so as to face to the light reflecting surface 11, and light transmitting through the light reflecting surface 11 is reflected on the white reflecting sheet 5 and returned to the light guide plate 1.

The light emitting surface 12 is arranged on a side opposing to the light reflecting surface 11 (a front surface side). Light from the point light sources 2 is reflected on the light reflecting surface 11, three side surfaces 13 of the light guide plate 1, and the reflecting sheet 5, and most of the incident light is emitted from the light emitting surface 12.

A diffusing sheet 3 and a lens sheet 4 are arranged on an upper surface of the light emitting surface of the light guide plate 1.

A reflector 22 surrounds an LED substrate 21 mounting the LEDs as the plurality of point light sources 2 in the light source part 20, and light from the point light sources 2 is guided to the light guide plate 1.

Color tone is one of performance indexes of a surface light source device. Generally it is evaluated by a xy value in a xy chromaticity diagram. Color tone is evaluated by color tone at a center part of the light emitting surface of the surface light source device, and color tone unevenness in comparing those of the center part and a peripheral part.

One unit of a surface light source device using a cold cathode ray tube lamp includes one unit of the cold cathode ray tube lamp. Therefore, color tone unevenness on a light emitting surface is reduced and color tone difference between individual lamps is relatively small.

On the other hand, a surface light source device using an LED element as a light source uses a plurality of the LED elements. Furthermore, color tone between the individual LED elements is different. Therefore, it has disadvantage in color tone and color tone unevenness as compared with the surface light source device using a cold cathode ray tube lamp.

In general, a white LED element is categorized into a plurality of grades by luminous intensity and color tone and is shipped with information of what grade of luminous intensity and color tone the LED element was given. However, it is difficult to specify and purchase LED elements of the desired grade. The purchaser can only confirm the properties of the purchased LEDs. In some case, although it is possible to specify the grade of LEDs to be purchased, it may have disadvantage in cost and delivery.

FIG. 3 is one example of color tone grades of a white LED element. In this example, LED elements are categorized into three grades "a, b, c" in the xy chromaticity diagram. As compared with an LED in the "b" grade in center, the LED in the "a" grade is bluey white, the LED in the "c" grade is yellowish white. A manufacturer gives this color tone grade with regard to distributions of white LED elements on a xy chromaticity diagram. More specific classification other than the three-group classification or other gradation are made in other cases.

When a surface light source device within a range of color tone indicated in a back light specification surrounded by a broken line in the figure, LED elements in the "b" grade are preferred in viewpoint of center color tone and evenness of color tone. However, when the device is only formed of only the "b" graded elements and the "a" and "c" graded elements are disused. Manufacture cost increases as a whole.

SUMMARY OF THE INVENTION

This invention was made to solve these problems and provides a surface light source device capable of suppressing chromaticity difference even in using a point light source. For example, a surface light source device equivalent to the one comprising only the white LED elements of the "b" grade is provided even when the white LED elements of the "a" and "c" grades are added to the "b" grade elements.

A surface light source device according to this invention comprises a light guide plate including a light incident surface and a light emitting surface, a light source part including a plurality of point light sources arranged on a light incident surface side of the light guide plate. Two of the point light sources of the light source part having chromaticity out of a center of an aimed chromaticity range in opposite hue directions are arranged adjacently.

The light incident surface is provided on one side end surface of the light guide plate, and the light emitting surface is provided on a front surface positioned in vertical direction to the one side end surface of the light guide plate.

A light reflecting member is provided on an opposite side of the light incident surface.

The light reflecting member is provided with chromaticity correcting means corresponding to emitted light.

The light source part is provided with not less than four point light sources, and two of the point light sources having chromaticity out of the center of the aimed chromaticity range in the opposite hue directions are arranged in an approximately center of a group of the plurality of the point light sources.

The two of the point light sources have the chromaticity outermost from the center of the aimed chromaticity range in the opposite hue directions.

The point light source comprises a white light emitting diode element.

The point light sources of different hues are arranged adjacently in the surface light source device of this invention. Therefore, colors of the point light sources are mixed and color tone turns into a medium one. Thus, the surface light source device capable of suppressing color tone difference as a whole can be provided.

An adjusting method of a surface light source device which light is incident from a plurality of point light sources arranged on a side of a light incident surface provided on a one side end surface of a light guide plate and is emitted from a light emitting surface on a front surface of the light guide plate comprises a process for arranging the plurality of the point light sources having chromaticity out of a center of an aimed chromaticity range in opposite hue directions adjacently, a process for providing measurement of light which is emitted from the point light source and further is emitted from the light guide plate and judging whether the light is in the aimed chromaticity range, and a process for arranging chromaticity correcting means corresponding to the emitted light in connection with an optical propagating path of the light guide plate when it is found from the measurement that the emitted light is not in the aimed chromaticity range.

With this method, the point light sources of different hues are arranged adjacently in the surface light source device of this invention, and colors of the point light sources are mixed and color tone turns into a medium one. Thus, the surface light source device capable of suppressing color tone difference as a whole can be provided, and the surface light source can satisfy an aimed chromaticity range. When the surface light source device out of the aimed chromaticity range can be modified in one having the aimed chromaticity range by arranging chromaticity correcting means in connection with an optical propagating path of the light guide plate.

An adjusting method of a surface light source device which light is incident from a light source arranged on a side of a light incident surface provided on a one side end surface of a light guide plate, is reflected on a reflecting member arranged in proximity to a rear surface opposite to a front surface of the light guide plate, and is emitted as a planeshaped light from the front surface of the light guide plate comprises a process for providing measurement of chromaticity difference from an aimed chromaticity range of light which is emitted from the light source and further emitted from the light guide plate, and a process for selecting a colored reflecting member for correcting the emitted light to be in the aimed chromaticity range as a reflecting member arranged in proximity of the rear surface of the light guide plate.

With this method, a chromaticity difference from the aimed chromaticity range is measured and a colored reflecting member for correcting emitted light to be in the aimed chromaticity range is arranged in proximity of the rear surface of the light guide plate on the basis of the measured chromaticity difference.

The point light sources and the light source comprises a group of the point light sources including not less than four white light emitting diode elements, and two of the white light emitting diode elements having chromaticity outermost from a center of the aimed chromaticity range in opposite hue directions are arranged in an approximately center of the group of the point light sources.

The chromaticity correcting means is a colored reflecting member provided on a rear surface opposite to the front surface of the light guide plate for emitting light.

The foregoing and other objects, features, aspects and advantages of the present invention will become more apparent from the following detailed description of the present invention when collected conjunction with the accompanying drawings.

DESCRIPTION OF PREFERRED EMBODIMENT(S)

Figure 1:
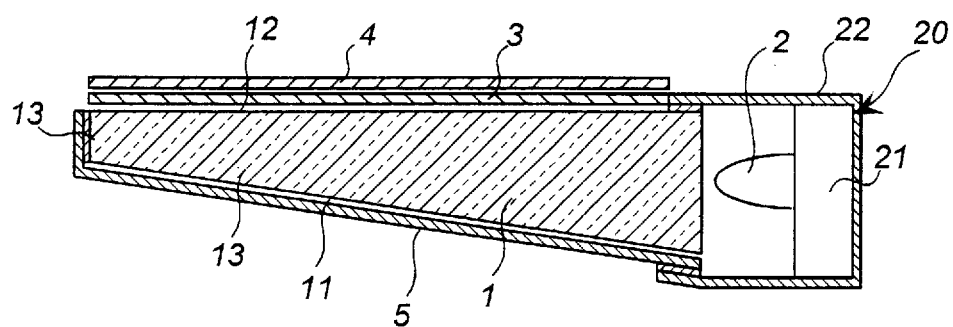
FIG. 1 is a cross sectional view illustrating a schematic structure of a surface light source device according to this invention.
Figure 2:
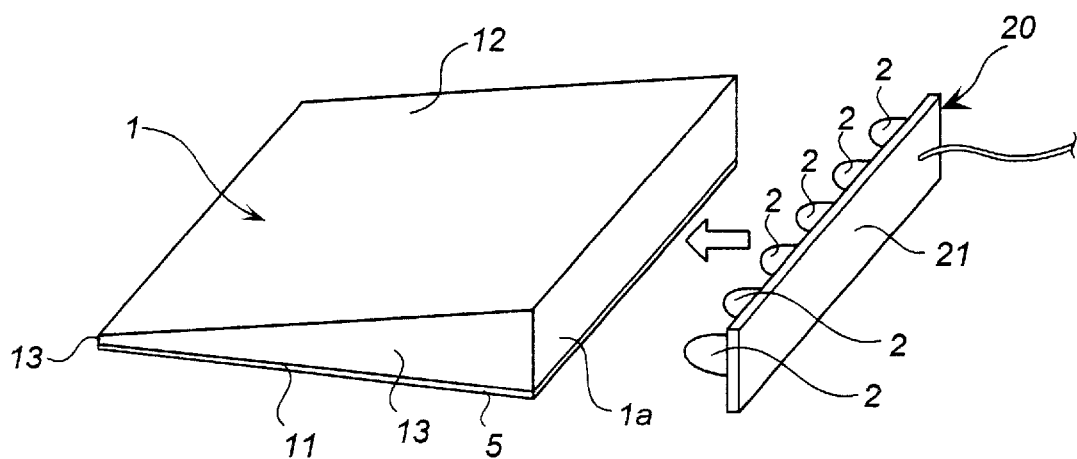
FIG. 2 is a perspective view illustrating a schematic structure of the surface light source device according to this invention.
Figure 3:
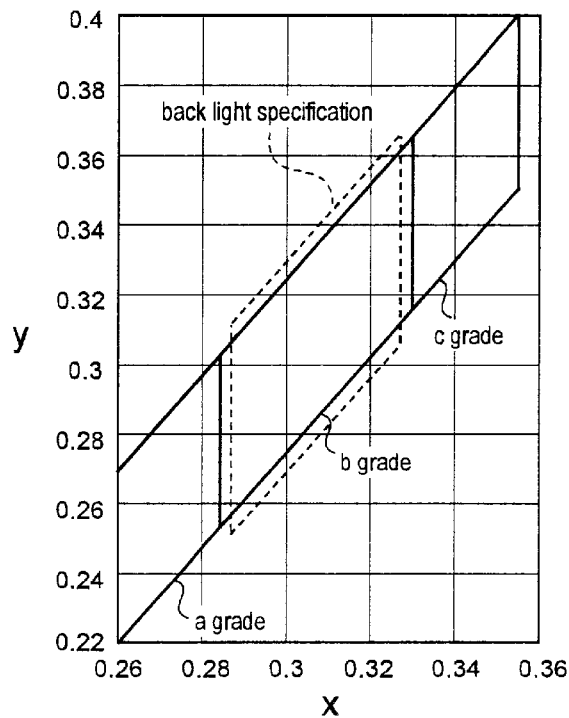
FIG. 3 is a xy chromaticity diagram illustrating one example of color tone grade of a white LED element.

Embodiments of this invention are explained by referring to the drawings. FIG. 2 is a perspective view illustrating a schematic structure of a surface light source device according to this invention. In this figure, a diffusing sheet and a lens sheet 4 arranged on a light emitting surface side and a reflector for surrounding point light sources are omitted. This invention is applied to a surface light source device in FIG. 1, and is pertinent to the surface light source device with a plurality of the point light sources 2 arranged in parallel on a light incident surface side of the light guide plate 1.

As shown in FIG. 2, the surface light source device according to this invention comprises a light guide plate 1, a light source part 20 provided with point light sources 2 formed of white LED elements, and any of controlling circuits (not shown). The controlling circuits includes a circuit for detecting a total quantity of light emitted from a light emitting surface 12 of the light guide plate 1 and adjusting and supplying power to the point light sources 2 so as to optimize quantity of the emitted light.

The point light sources 2 formed by the white LED elements are arranged opposite to the light incident surface 1a provided on an edge part of the light guide plate 1. In this embodiment, six white LED elements as the point light sources 2 are arranged on a substrate 21. This white LED element may be structured by housing three LEDs of R, G, B so as to emit white light or may be structured by using a single color LED and converting emitted light from the LED into white light by the aid of phosphor material. For example, the phosphor material may be YAG(yttrium aluminum garnet) based phosphor material for a GaN based blue LED.

A reflecting sheet 5 serving as light reflecting material is arranged on a rear surface of one main surface on a side vertical to the point light sources 2 of the light guide plate 1, and forms a light reflecting surface 11 together with the rear surface. The light reflecting surface 11 is formed to have a recessed part of a cone shape or is dot-printed so as to prevent light leakage and improve reflection efficiency.

The light emitting surface 12 is provided on a side opposite to the light reflecting surface 11 of the light guide plate 1. Light from each of the LEDs of the point light sources 2 is reflected to the light reflecting surface 11 including the reflecting sheet 5 and the three side surfaces of the light guide plate 1, and most of the incident light is emitted as synthesized light of uniform directivity from the light emitting surface 12.

Material for the light guide plate 1 is selected from translucent material, generally acrylic or polycarbonate resin is used. The shape of the light guide plate 1 is a parallel flat plate and a cross sectional wedge-shaped flat plate, and the thickness is generally 1–5 mm. The LED can reduce the thickness of the device as compared with a cold cathode ray tube lamp.

Examples of the other transparent materials include acrylic ester such as polymethyl methacrylate and polyacrylic acid methyl, methacrylate ester alone or its copolymers, polyester such as polyethylene terephthalate and polybutylene terephthalate, thermoplastic resin such as polycarbonate, polystyrene, and polymethylpentene, acrylate such as multifunctional urethane acrylate and polyester acrylate cross-linked by ultraviolet rays or electron beams, transparent resin such as unsaturated polyester, transparent glass, and transparent ceramics.

A diffusing sheet and a lens sheet (not shown in FIG. 2) are arranged on an upper surface of the light emitting surface 11 of the light guide plate 1. The number of sheets may be one or two, and may be interposed in the reverse order.

The LED substrate 21 mounted with the LED elements is fixed to an outer frame (not shown) positioned on an outer side of the light guide plate 1 with a screw or adhesive, and the point light sources 2 are arranged on a predetermined position of the light guide plate 1.

Light from the LEDs of the point light sources 2 enters an inside of the light guide plate 1, is reflected to the light reflecting pattern provided on the light reflecting surface 11 and three side end surfaces 13, is focused repeatedly, is emitted from the light emitting surface 12 of the light guide plate 1 to the diffusing plate 3, is uniformly and isotropically diffused within a desired range of angles corresponding to the lens sheet, and is emitted as synthesized light. A liquid crystal display panel is arranged in proximity of the lens sheet.

Figure 4:
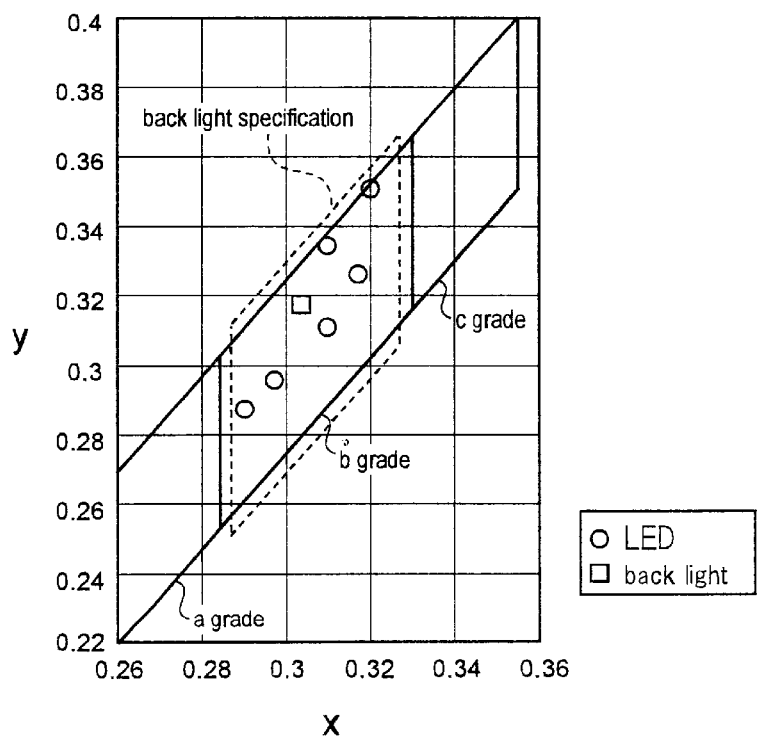
FIG. 4 is a xy chromaticity diagram illustrating color tone of the surface light source device using the white LED elements of the "b" grade.

The surface light source device of the first embodiment is formed by using six white LED elements only of the "b" grade as the point light sources 2. Color tone of the surface light source device is shown in FIG. 4. "○" in the diagram indicates chromaticity of each of the six white LED elements, and "□" indicates chromaticity of the surface light source when the surface light surface device is formed by the six white LED elements. As shown in FIG. 4, all of the white LED elements are classified in the "b" grade and the chromaticity on the surface light source satisfies the specification.

Explanation on the surface light source device comprising four white LED elements of the "b" grade, one white LED element respectively of the "a" and "c" grades.

The LED elements on the LED substrate 21 is arranged in an order of the grades b, a, b, b, c, b from a left side as shown in Table 1, and the surface light source device of the second embodiment is formed.

TABLE 1

| Arrangement on the LED substrate (from a left side) | | | | | |
|---|---|---|---|---|---|
| 1 | 2 | 3 | 4 | 5 | 6 |
| b | a | b | b | c | b |

Figure 5:
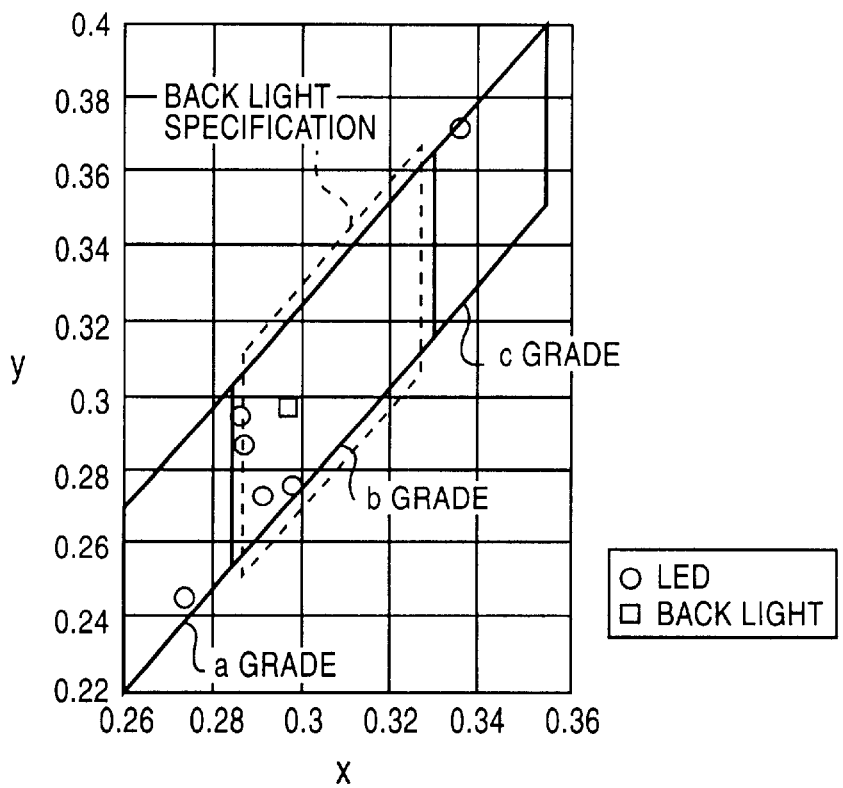
FIG. 5 is a xy chromaticity diagram illustrating color tone of the surface light source device using the white LED elements of the "a, b, c" grades.

FIG. 5 illustrates chromaticity of each of white LED elements and chromaticity of a surface light source of the surface light source device of a second embodiment. In this diagram, "○" indicates chromaticity of each of the six white LED elements, and "□" is chromaticity on the surface light source formed by the white LED elements. As shown in FIG. 5, chromaticity of the surface light source in this structure satisfies the specification.

Figure 6:
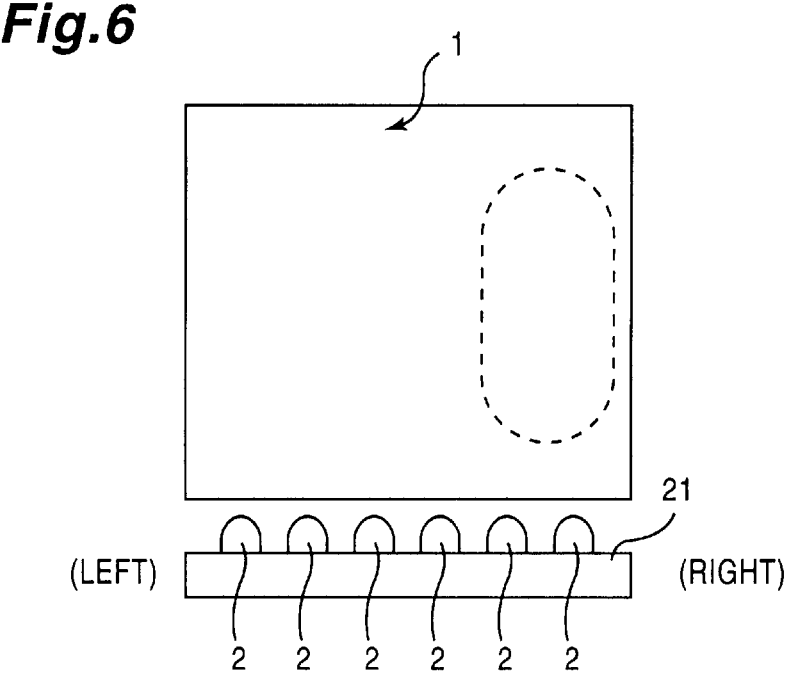
FIG. 6 is a schematic plane view of a surface light source device which is a base of this invention.

However, as shown in FIG. 6, yellowish color tone unevenness is observed on a right side where the white LED element of the "c" grade is arranged and degrades the quality of the surface light source.

Then, a surface light source device in this embodiment is formed by preparing white LED elements of approximately equal chromaticity as those used in the second embodiment and changing arrangement order of the white LED elements on the LED substrate 21.

In this embodiment, four LED of the "b" grade, and one white LED element of the "a" and "c" grades respectively are used, and the arrangement order is b, b, c, a, b, b as shown in Table 2.

TABLE 2

| Arrangement on the LED substrate (from a left side) | | | | | |
|---|---|---|---|---|---|
| 1 | 2 | 3 | 4 | 5 | 6 |
| b | b | c | a | b | b |

Figure 7:
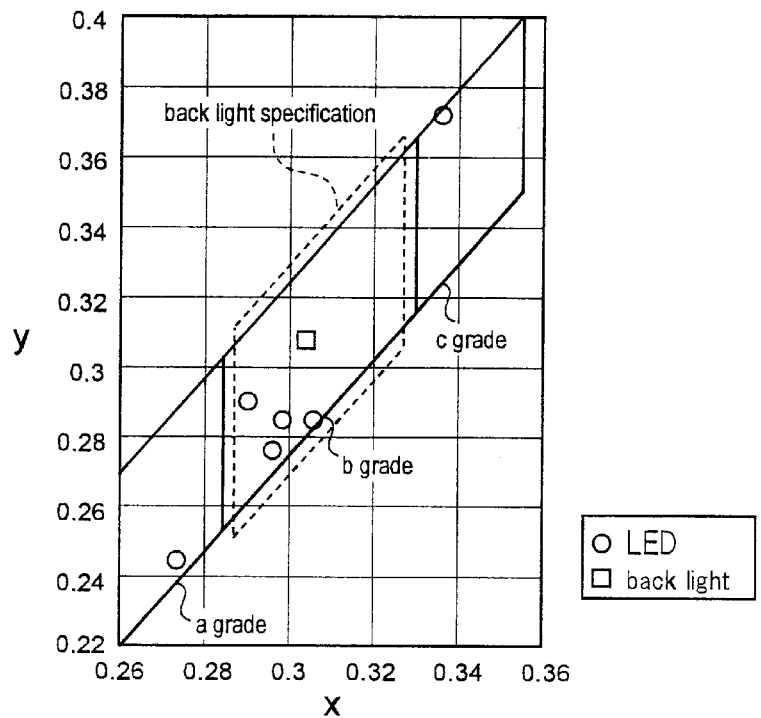
FIG. 7 is a xy chromaticity diagram illustrating color tone of the surface light source device of this embodiment using the white LED elements of the "a, b, c"grades.

FIG. 7 illustrates chromaticity of each of the white LED elements and chromaticity of the surface light source of this embodiment. In this diagram, "○" indicates chromaticity of each of the six white LED elements, and "□" indicates chromaticity on the surface light source formed by the white LED elements. As shown in FIG. 7, chromaticity on the surface light source in this structure satisfies specification required.

Color tone unevenness observed in the second embodiment does not appear and a surface light source of good quality is provided.

The reason for this seems as follows. In the case of the surface light source device of the second embodiment, more incident light from the white LED elements of the "b" and "c" grades is incident to a right end part of the light emitting surface, and the emitting light has a mixed color of the "b" and "c" grades. On the other hand, in the surface light source device of this embodiment, LEDs of the "a" and "c" grades are arranged in proximity at a center part of the LED substrate 21, and colors of these LEDs are mixed to be a middle color between "a" and "c" that is like the color of the "b" grade. Therefore, this embodiment can provide a surface light source device having less unevenness in chromaticity.

In the above embodiment, the point light sources 2 of six white LED elements are used. The number of the point light sources is not limited to six. When more than two point light sources 2 are used, the two white LED elements which have chromaticity outermost from the center of the aimed chromaticity range in opposite hue directions are selected and arranged adjacently on the LED substrate 21 so that color tone unevenness is reduced. When more than four point light sources 2 are used, the two white LED elements which have chromaticity outermost from the center of the aimed chromaticity range in the opposite hue directions are selected and arranged adjacently in an approximately center of a group of the plurality of the point light sources 2 on the LED substrate 21 so that color tone unevenness is reduced.

When structuring a surface light source device using a plurality of the white LED elements, the white LED elements outermost from the center of the aimed chromaticity range (in this embodiment, x=approximately 0.31, y=0.31) in the opposite hue directions (in this embodiment, lower left side (blue) and the upper right side mellow) in the chromaticity diagram) are selected and positioned adjacently on the LED substrate 21 so that color tone unevenness is reduced. As a result, the white LED elements of a wide range of chromaticity can be used and cost for the surface light source device is reduced.

As described above, this invention can suppress color tone unevenness in using the point light sources and cost of the surface light source device. This invention also can provide a surface light source device having uniform color tone and a center chromaticity equivalent to those of a surface light source device comprising the white LED element of the "b" grade even when the device comprises white LED elements of the "a" and "c" grades together with the elements of the "b" grade. Therefore, white LED elements in a wide chromaticity range are available and cost for the surface light source device can be reduced.

The surface light source device capable of reducing color tone unevenness and satisfying a chromaticity range is provided by adjusting arrangement of the plurality of the white LED elements. However, some of the surface light source devices may deviate from a specification of a chromaticity range. This is because that the dispersion of chromaticity of the white LED elements of a same grade is not uniform.

To solve this problem, in this embodiment chromaticity is adjusted to be within the specification by arranging chromaticity correcting means for emitted light in connection with an optical propagating path of the light guide plate in the surface light source device having chromaticity out of a range of the specification while using the white LED elements in a wide range of chromaticity.

To be concrete, the point light sources of the white LED element of each of the grades are mounted on the LED substrate 21 in accordance with the above rule, and then the LED substrate 21 is mounted on the light guide plate 1 with a white reflecting sheet 5 arranged in advance as a reference chromaticity or an aimed chromaticity and all of the point light sources 2 light up to measure the chromaticity of the surface light source.

Judgment on the basis of the measurement is conducted to judge whether the chromaticity of the surface light source is within the aimed chromaticity range. The surface light source judged as a non-defective unit continues to be on production line so that the surface light source device is assembled.

The LED substrate 21 judged as defective is removed from the light guide plate 1 and a new light guide plate 1 having a colored reflecting sheet 5 for color tone difference on the basis of the color tone difference from the aimed chromaticity range is prepared and mounted. Relation between color tone difference and a plurality of the prepared colored reflecting sheets 5 is stored in a table so that selection of chromaticity for correcting the color tone difference is automatically performed on the basis of the color tone difference obtained from the measurement.

Through this selections of the colored reflecting sheet 5 having a desired chromaticity, the LED substrate out of specification can turn into a usable non-defective unit.

The chromaticity correcting means is not necessarily provided on the reflecting sheet 5 as long as it is provided in relation to the optical propagating path of the light guide plate 1. Thus, it may be provided between the point light source 2 and the light guide plate 1. However, because the reflecting sheet 5 provided with a correcting function does not increase the number of components and the reflecting sheet 5 itself serves as a normal reflecting sheet 5 required in any of surface light source devices which does not need correction, the reflecting sheet 5 having the chromaticity correcting means may be preferred.

Figure 8:
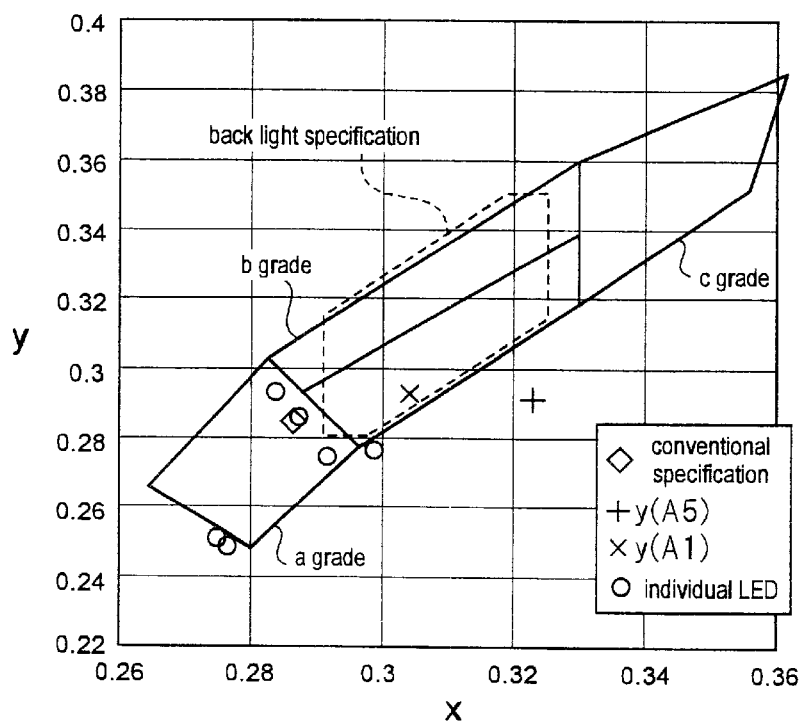
FIG. 8 is a xy chromaticity diagram illustrating color tone of the surface light source device according to this embodiment using the white LED elements categorized approximately in the "a" grade.

FIG. 8 is a xy chromaticity diagram for explaining an adjusting method of chromaticity in another embodiment. In this embodiment different from the above embodiments, chromaticity is adjusted without changing arrangement of the white LED elements of the LED substrate 21. Thus, in this embodiment, the grades (a, b, c) of the white LED elements do not have substantial effect to the chromaticity of the surface light source.

The surface light source device of FIG. 8 comprises the six white LED elements (the number of elements is not restricted and the device may comprise a single element in this embodiment), and xy chromaticity of each of the elements is generally of the "a" grade as indicated with "○" in the diagram. It has been found from the measurement that the chromaticity of the surface light source is marked out of the aimed chromaticity range as plotted with a diamond (indicated as a conventional specification).

In accordance with the result of the measurement, the colored reflecting sheet 5 corresponding to the color tone difference is selected on the basis of the table prepared above in accordance with the color tone difference as described above and is made to correspond to the aimed chromaticity range. In this embodiment, a color temperature converting filter No. A1 (indicated as y(A1)) by Tokyo Butai Syowmei Co., Ltd. is used so that the color temperature is converted from 3400° k to 3200° k and the surface light source device having the aimed chromaticity range plotted with a symbol "x" is provided.

When a color temperature converting filter No. A5 (indicated as y(A5)) by Tokyo Butai Syowmei Co., Ltd. for converting from 5500° k to 3200° k is used for comparison, the chromaticity is marked out of the aimed chromaticity range as plotted with a symbol "+".

This embodiment has been paid attention to the conventional reflecting sheet 5 and provides a function for correcting chromaticity to the reflecting sheet 5. Thus, the LED substrate 21 out of the aimed range of chromaticity can become usable without adding a component.

As described above, this adjusting method according to this invention can suppress color tone unevenness in using a point light source, and reduce cost for the surface light source device.

In addition, a surface light source device equivalent to the one comprising only the white LED elements of the "b" grade is provided even when the white LED elements of the "a" and "c" grades are added to the "b" grade elements, the white LED elements of only the "a" grade or the "c" grade, or the white LED elements not strictly categorized by such the grades are used. As a result, the white LED elements in a wide range of chromaticity can be used to reduce cost for the surface light source device.

In this invention, the chromaticity difference from the aimed chromaticity range is measured. The colored reflecting member for correcting the emitted light to be within the aimed chromaticity range is arranged in proximity of a rear surface of the light guide plate on the basis of the measured chromaticity difference. With these structures, a surface light source device having the aimed chromaticity range is provided, and light sources having a wide range of chromaticity can be used and cost for the surface light source device can be suppressed.

Although the present invention has been described and illustrated in detail, it is clearly understood that the same is and example only and is not to be taken by way of limitation by way of illustration, the spirit and scope of the present invention being limited only by the terms of the appended claims.

What is claimed is:

1. A surface light source device comprising
    a light guide plate including a light incident surface and a light emitting surface,
    a light source part including a plurality of point light sources arranged on a light incident surface side of the light guide plate, wherein
    two of the point light sources of the light source part having chromaticity out of a center of an aimed chromaticity range in opposite hue directions are arranged adjacently.

2. The surface light source device according to claim 1, wherein
    the light incident surface is provided on one side end surface of the light guide plate, and the light emitting surface is provided on a front surface positioned in vertical direction to the one side end surface of the light guide plate.

3. The surface light source device according to claim 1, wherein
    a light reflecting member is provided on an opposite side of the light incident surface.

4. The surface light source device according to claim 3, wherein
    the light reflecting member is provided with chromaticity correcting means corresponding to emitted light.

5. The surface light source device according to claim 4, wherein
    the chromaticity correcting means is a colored reflecting member provided on a rear surface opposite to the light emitting surface of the light guide plate.

6. A surface light source device comprising
    a light guide plate including a light incident surface and a light emitting surface,
    a light source part including a plurality of point light sources arranged on a light incident surface side of the light guide plate, wherein
    two of the point light sources of the light source part having chromaticity out of a center of an aimed chromaticity range in opposite hue directions are arranged adjacently, and wherein
    the light source part is provided with not less than four point light sources, and two to the point light sources having chromaticity out of the center of the aimed chromaticity range in the oppsity hue directions are arranged in an approximately center of a group of the plurality of the point light sources.

7. A surface light source device comprising
    a light guide plate including a light incident surface and a light emitting surface,
    a light source part including a plurality of point light sources arranged of a light incident surface side of the light guide plate,
    two of the point light sources of the light source part having chromaticity out of a center of an aimed chromaticity range in opposite hue directions are arranged adjacently, and wherein
    the two of the point light sources have the chromaticity outermost from the center of the aimed chromaticity range in the opposite hue direction.

8. The surface light source light device according to claim 1, wherein the point light sources each comprise a white light emitting diode element.

9. An adjusting method of a surface light source device which light is incident from a plurality of point light sources arranged on a side of a light incident surface provided on a one side end surface of a light guide plate and is emitted from a light emitting surface on a front surface of the light guide plate, comprising
    a process for arranging the plurality of the point light sources having chromaticity out of a center of an aimed chromaticity range in opposite hue directions adjacently,
    a process for providing measurement of light which is emitted from the point light source and further is emitted from the light guide plate and judging whether the light is in the aimed chromaticity range, and
    a process for arranging chromaticity correcting means corresponding to the emitted light in connection with an optical propagating path of the light guide plate when it is found from the measurement that the emitted light is not in the aimed chromaticity range.

10. An adjusting method of a surface light source device which light is incident from a light source arranged on a side of a light incident surface provided on a one side end surface of a light guide plate, is reflected on a reflecting member arranged in proximity to a rear surface opposite to a front surface of the light guide plate, and is emitted as a plane-shaped light from the front surface of the light guide plate, comprising
    a process for providing measurement of chromaticity difference from an aimed chromaticity range of light which is emitted from the light source and further emitted from the light guide plate, and
    a process for selecting a colored reflecting member for correcting the emitted light to be in the aimed chromaticity range as a reflecting member arranged in proximity of the rear surface of the light guide plate.

11. An adjusting method of a surface light source device which light is incident from a plurality of point light sources arranged on a side of a light incident surface provided on a one side end surface of a light guide plate and is emitted from a light emitting surface on a front surface of the light guide plate, comprising a process for arranging the plurality of the point light sources having chromaticity out of a center of an aimed chromaticity range in opposite hue directions adjacently, a process for providing measurement of light which is emitted from the point light source and further is emitted from the light guide plate and judging whether the light is in the aimed chromaticity range, and a process for arranging chromaticity correcting means corresponding to the emitted light in connection with an optical propagating path of the light guide plate when it is found from the measurement that the emitted light is not in the aimed chromaticity range, and wherein the point light sources and the light source comprises a group of the point light sources including not less than four white light emitting diode elements, and two of the white light emitting diode elements having chromaticity outermost from a center of the aimed chromaticity range in opposite hue directions are arranged in an approximately center of the group of the point light sources.

12. An adjusting method of a surface light source device which light is incident from a plurality of point light sources arranged on a side of a light incident surface provided on a one side end surface of a light guide plate and is emitted from a light emitting surface on a front surface of the light guide plate, comprising a process for arranging the plurality of the point light sources having chromaticity out of a center of an aimed chromaticity range in opposite hue directions adjacently, a process for providing measurement of light which is emitted from the point light source and further is emitted from the light guide plate and judging whether the light is in the aimed chromaticity range, and a process for arranging chromaticity correcting means corresponding to the emitted light in connection with an optical propagating path of the light guide plate when it is found from the measurement that the emitted light is not in the aimed chromaticity range, and wherein the chromaticity correcting means is a colored reflecting member provided on a rear surface opposite to the front surface of the light guide plate for emitting light.

\* \* \* \* \*